United States Patent Office

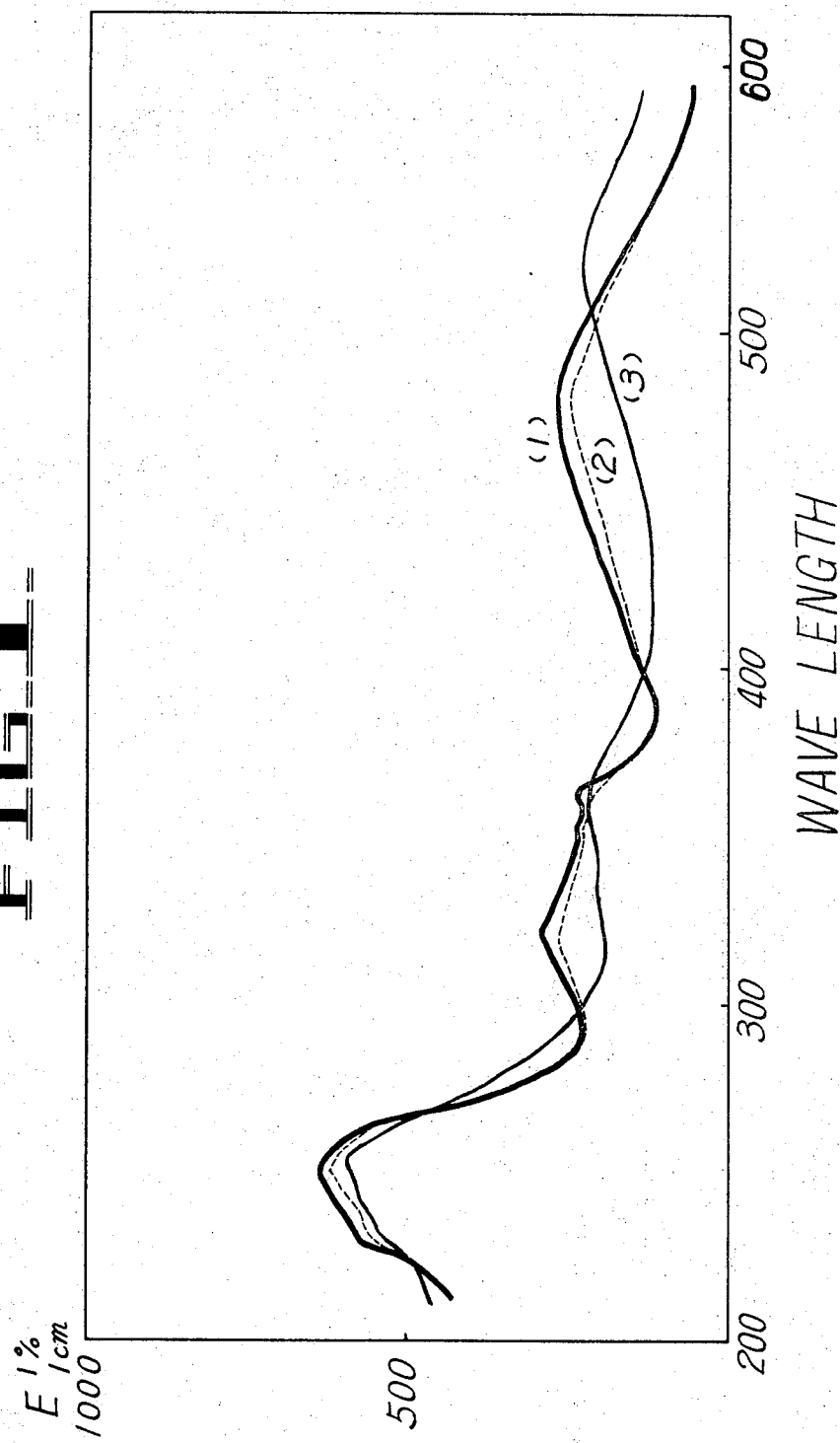

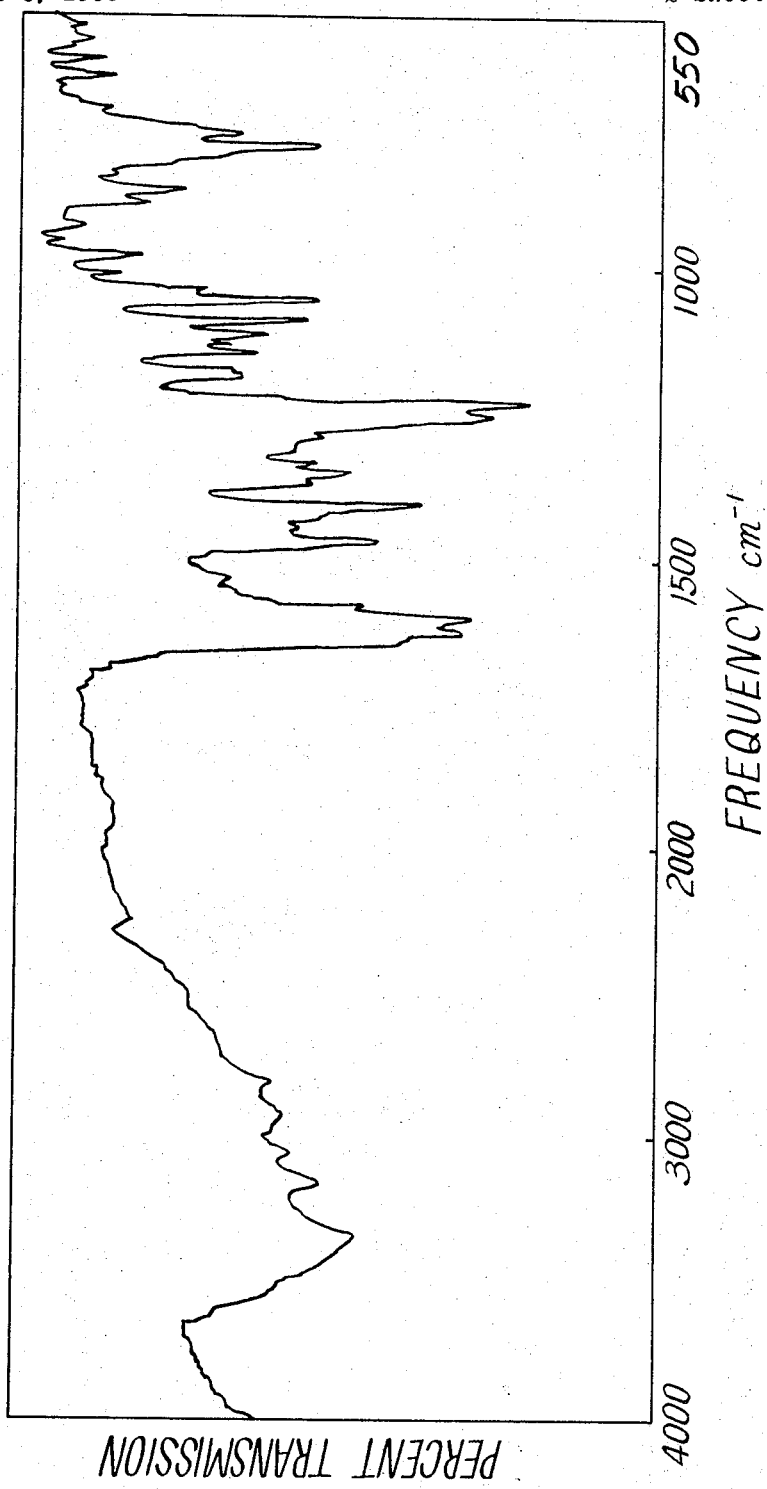

3,769,403
Patented Oct. 30, 1973

3,769,403
ERICAMYCIN AND PRODUCTION THEREOF
Takeshi Hara, 2222 Komae-machi, Kitatama-gun, Tokyo, Japan; Taro Niida, 127 Naka-Kibogaoka, Hodogaya-ku, Yokohama-shi, Japan; Kimio Satoh, 1700–163 Kami-Hirama, Kawasaki-shi, Japan; Shinichi Kondo, Minami Hiyoshi Danchi 23–204, 1053, Hiyoshi-Hommachi, Kohhoku-ku, Yokohama-shi, Japan; Eiichi Akita, 5–15 Minami 1-chome, Meguro-ku; and Masaji Sezaki, 1–453 Kamiuma-cho, Setagaya-ku, both of Tokyo, Japan; Masaru Shimura, 1443 Hiyoshi-Honcho, Kohhoku-ku, Yokohama-shi, Japan; and Takako Nishio, 1473 Senzoku, Meguro-ku; Kazuko Hamamoto, 6–1 Koigakubo, Kokubunji-shi; and Makiko Koike, 1290, 4-chome, Nishi-Nakanobu, Shinagawa-ku, all of Tokyo, Japan
Filed June 8, 1966, Ser. No. 556,027
Claims priority, application Japan, June 15, 1965, 40/35,203
Int. Cl. A61k 21/00
U.S. Cl. 424—122                    7 Claims

ABSTRACT OF THE DISCLOSURE

Ericamycin, new antibiotic having empirical formula $C_{31}H_{23}O_8N$, produced from a strain of *Streptomyces varius*, the antibiotic being useful to inhibit the growth of Gram-positive bacteria and also useful to increase synergetically the action of kanamycin, streptomycin, erythromycin, penicillins and chloramphenicol when they are administered together.

---

This invention relates to a new antibiotic substance called ericamycin, and to its production. More particularly, this invention relates to a process for its production by fermentation and methods for its recovery and purification. This antibiotic substance ericamycin is highly effective in inhibiting the growth of Gram-positive bacteria and particularly the growth of *Staphylococcus aureus* which is fast to the action of various type of known antibiotics.

Ericamycin shows a toxicity to mice but can highly inhibit the growth of *Staphylococcus aureus* which is fast against the action of the known antibiotics such as kanamycin, streptomycin, erythromycin, penicillins and chloramphenicol etc. When used together with said known antibiotic substances, ericamycin has an advantageous nature that its antibiotic activity can be increased twice to ten times higher, even if each of those known antibiotics present in a lower concentration than those which give the resistance to Gram-positive bacteria.

According to the present invention, therefore, there is now provided a new antibiotic substance ericamycin having an activity inhibitory to the growth of Gram-positive bacteria, ericamycin being a substance which is soluble in dimethyl sulfoxide, dimethyl formamide, tetrahydrofuran and dioxane; slightly soluble in methyl ethyl ketone, methyl iso-butyl ketone, ethyl acetate, butyl acetate, methanol, ethanol, acetone, ethyl ether, chloroform and benzene; and little soluble in water, petroleum ether, hexane and carbon tetrachloride which forms a reddish orange-colored needle-like or platelet-like crystal of a meeting point of 260° C.–265° C. with decomposition; its acidic solution in an organic solvent showing a red color; its alkaline solution in an organic solvent showing a bluish purple color; its solution in concentrated nitric acid showing a yellow color; its solution in concentrated sulfuric acid showing a bluish purple color; its alcoholic solution giving a purple color when reacted with iron perchloride; its alcoholic solution giving a purple colored precipitate when lead acetate is added thereto; and the alcoholic solution losing its color when acetic acid and zinc are added thereto but recovering its color when the solution is allowed to stand, which gives a negative reaction to ninhydrin reagent, which contains only the elements carbon, hydrogen, nitrogen and oxygen and has the empirical formula $C_{31}H_{23}O_8N$; the molecular weight of ericamycin being 450–525 as determined by Barger method, which exhibits the characteristic absorption bands in the infrared region of the spectrum when pelleted with potassium bromide at the following frequencies in cm.$^{-1}$: 3370, 3180, 1639, 1619, 1480, 1420, 1370, 1268, 1250, 1140, 1110, 1055, 1038, 968, 875, 805, 730 and 675, and which exhibits in the visible and ultra-violet region of the spectrum five maximum absorpotion bands at the wave lengths of 250, 324, 346, 364 and 490 milli-microns when dissolved in methanol; five maximum absorption bands at the wave lengths of 250, 324, 346, 364 and 490 milli-microns when dissolved in methanol containing 0.01 N hydrochloric acid; and three maximum absorption bands at the wave lengths of 254, 360 and 525 milli-microns when dissolved in methanol containing 0.01 N sodium hydroxide.

Referring to the attached drawings:
FIG. 1 shows curves of the visible and ultra-violet absorption spectrum of crystalline ericamycin dissolved in methanol, in a methanolic solution of 0.01 N hydrochloric acid and in a methanolic solution of 0.01 N sodium hydroxide.

FIG. 2 shows a curve of the infrared absorption spectrum of ericamycin pelleted with potassium bromide.

As to FIG. 1, the thick full line curve 1 exhibits the absorption spectrum of crystalline ericamycin dissolved in a methanolic solution of 0.01 N hydrochloric acid and shows five maximum absorptions $$E_{1\,cm.}^{1\%} = 630$$

at the wave length of 250 milli-microns, $$E_{1\,cm.}^{1\%} = 285$$

at the wave length of 324 milli-microns, $$E_{1\,cm.}^{1\%} = 235$$

at the wave length of 346 milli-microns, $$E_{1\,cm.}^{1\%} = 230$$

at the wave length of 364 milli-microns and $$E_{1\,cm.}^{1\%} = 260$$

at the wave length of 490 milli-microns. The broken line curve 2 exhibits the absorption spectrum of crystalline ericamycin dissolved in methanol and shows five maximum absorptions $$E_{1\,cm.}^{1\%} = 610$$

at the wave length of 250 milli-microns, $$E_{1\,cm.}^{1\%} = 265$$

at the wave length of 324 milli-microns, $$E_{1\,cm.}^{1\%} = 230$$

at the wave length of 346 milli-microns, $$E_{1\,cm.}^{1\%} = 220$$

at the wave length of 364 milli-microns and $$E_{1\,cm.}^{1\%} = 240$$

at the wave length of 490 milli-microns. The thin full curve 3 exhibits the absorption spectrum of crystalline ericamycin dissolved in a methanolic solution of 0.01 N sodium hydroxide and shows three maximum absorptions $$E_{1cm}^{1\%} = 590$$

at the wave length of 254 milli-microns, $$E_{1cm}^{1\%} = 210$$

at the wave length of 360 milli-microns and $$E_{1cm}^{1\%} = 228$$

at the wave length of 525 milli-microns.

A result of elementary analysis have shown that ericamycin does neither contain any halogen nor any heavy metal but consists of 68.42% C, 4.42% H, 2.61% N and 23.85% O, for example. The molecular weight of ericamycin is 450–525 as determined by Barger method, and therefore ericamycin is most appropriately considered to have the empirical formula $C_{31}H_{23}O_8N$ (molecular weight 537).

Ericamycin has been subjected to a thin layer chromatography by employing glass plates to which a suspension of 20 grams of silica gel H (produced by Merk Company, in Germany) in 50 ml. of a buffer solution having a pH of 2 and containing 0.05 mol. of phosphoric acid and sodium hydroxide had been applied and which had then been dried. In this chromatography ericamycin has exhibited a $R_f$-value of 0.8 when a 4:1:2 mixture of butanol, methanol and water has been used as the solvent; a $R_f$-value of 0.5 when a 10:2 mixture of benzene and methanol has been used as the solvent; and a $R_f$-value of 0.7 when a 1:10 mixture of tetrahydrofuran and methanol has been used as the solvent. A single spot of ericamycin has been observed in any case of development.

Ericamycin is a stable substance and its antibacterial activity does not decrease even when a solution of ericamycin in dimethyl formamide has been heated at 100° C. for one hour. When an amount of sodium hydroxide is added to a solution of ericamycin in an organic solvent such as methanol, ethanol and ethyl acetate etc., there is deposited a bluish purple colored precipitate. In case an equivalent amount of hydrochloric acid is then added to the solution containing the precipitate, the precipitate can be re-dissolved and the solution can recover its original color. Even after this treatment, it may be observed that the antibacterial activity of ericamycin has not reduced.

Ericamycin shows the following antibacterial spectrum:

| Test organisms: | Minimum inhibitory concentration (mcg./ml.) |
|---|---|
| Bacillus subtilis ATCC 6633 | 0.62 |
| Bacillus subtilis PCI 219 | 0.78 |
| Sarcina lutea | 0.16 |
| Staphylococcus albus | 1.56 |
| Staphylococcus aureus R [a] | 0.063 |
| Staphylococcus aureus R [a]+SM 200 mcg./ml.[b] | 0.016 |
| Staphylococcus aureus 209P PC-resistant (100 u./ml.) | 0.25 |
| Staphylococcus aureus 209P+PC 50 u./ml.[b] | 0.062 |
| Staphylococcus aureus 209P SM-resistant (100 mcg./ml.) | 0.25 |
| Staphylococcus aureus 209P+SM 50 mcg./ml.[b] | 0.125 |
| Stahphylococcus aureus 209P CP-resistant (12.5 mcg./ml.) | 0.125 |
| Stahpylococcus aureus 209P+CP 5 mcg./ml.[b] | 0.062 |
| Staphylococcus aureus 209P EM-resistant (30 mcg./ml.) | 0.125 |
| Stahpylococcus aureus 209P+EM 10 mcg./ml.[b] | 0.03 |
| Stahpylococcus aureus 209P KM-resistant (12.5 mcg./ml.) | 0.125 |
| Staphylococcus aureus 209P KM 5 mcg./ml.[b] | 0.016 |
| Staphylococcus aureus 209P | 0.25 |
| Streptococcus haemolyticus Cook | 0.02 |

See footnotes at end of table.

TABLE—Continued

| Test organisms: | Minimum inhibitory concentration (mcg./ml.) |
|---|---|
| Streptococcus faecalis ATCC 8043 | 0.04 |
| Diplococcus pneumoniae Type-1 | 0.02 |
| Corynebacterium diphtheriae gravis | 50 |
| Bacillus anthracis No. 119 | 25 |
| Klebsiella pneumoniae | >100 |
| Salmonella typhosa 0–901-W | >100 |
| Shigella dysenteriae Shigae | >100 |
| Pseudomonas aeruginosa | >100 |
| Escherichia coli communis | >100 |
| Mycobacterium sp. 607 | >100 |
| Mycobacterium tuberculosis $H_{37}Rv$ | 1.56 |

[a] This strain is resistant to PC 200 u/ml., SM 400 mcg./ml., CP 10 mcg./ml., EM 200 mcg./ml., TC 50 mcg./ml. and KM 25 mcg./ml.

[b] The antibiotics were added to the assay medium.

Abbrev.: PC=penicillin, SM=Streptomycin, CP=chloramphenicol, EM=erythromycin, TC=tetracycline, KM=kanamycin.

NOTE.—In the cases marked by [b], the indicated antibiotic(s) was added in the testing medium in such a concentration that was approximately a half of the minimum concentration of the antibiotic(s) to which the micro-organisms tested could be resistant.

Acute toxicity of ericamycin was determined in mice. In the intraperitoneal injection of ericamycin, the value of $LD_{50}$ amounted to 0.5–1.0 mg./kg. Mice tolerated the oral administration of 100 mg./kg. of ericamycin without any side-effect. In the test of treating Ehrlich's ascites tumor in mice, daily administration of 3 meg. of ericamycin per mouse was made for 11 days and observation of mice was continued for 30 days during which it was found that the administration of ericamycin had the effects of suppressing an increase in body weight and of prolonging the life of the infected mice.

Among the known antibiotics, bostricoidin as reported in the "Journal of Biological Chemistry" vol. 208, page 107 (1954), TA-435A, as mentioned in the "Journal of Antibiotics" B, vol. 17, page 245 (1964), and 9865 RP as mentioned in Japanese patent publication No. 8,800/1965 are relatively similar to ericamycin but clearly distinguishable from ericamycin with respect to their physical and chemical properties such as elementary analysis, absorptions in the visible, ultra-violet and infrared regions of spectrum as well as their physiological properties.

According to the present invention, there is further provided a process for the production of ericamycin which comprises cultivating a strain of Streptomyces varius or a natural or artificial variant or mutant thereof in a nutrient medium until a substantial amount of ericamycin is accumulated in the culture, and then recovering ericamycin from the culture.

The organism producing ericamycin of the present invention was isolated from a sample of soil collected in the area of Gohdonbaru in Kumamoto Prefecture, Japan, and is a new species, designated Streptomyces varius, of the genus Streptomyces. A culture of the living organism isolated from the soil has been deposited in the American Type Culture Collection, Washington, D.C., and added to its permanent collection of micro-organisms at ATCC No. 19562.

Streptomyces varius has the following characteristics:
(1) Morphological characteristics:
(i) Aerial mycelium: Aerial mycelium extends long and straightly and the mycelia develop in the state of tuft. The aerial mycelium bears a chain of conidia at the tip.
(ii) Vegetative mycelium: The conidia are shake-cultured in a glucose-meal extract medium and initially show a linear growth. About 20 hours after the start of the cultivation, the conidia entirely begin to divide and change into spherical or oval cells. When these cells divided are transferred into a fresh nutrient medium, they develop the germ tubes similarly to the spores grown and then form the mycelium again. A similar division phenomenon may be observed on a glucose-meat extract-agar medium but in this case there are formed many of the cells of short-rod shape in the third day of the cultivation.

(iii) Spores: The spores formed are oval in their shape and not uniform in their size. The spores have a size of about 0.5–0.9 by 0.6–1.7 microns. The spore surface is smooth.

(2) Conditions on various nutrient medium:

(i) On sucrose-Czapek-agar medium, incubated at 28° C. for 20 days: The growth is scant.

(ii) On glycerol-Czapek-agar medium, incubated at 28° C. for 20 days: The growth is thin and purple colored. Aerial mycelium is greyish colored but its formation is scant. There is no soluble pigment.

(iii) On glucose-asparagine-agar Krainsky medium, incubated at 28° C. for 20 days: The growth is good and purple colored but this color is likely to vanish in the successive transfer culture. The formation of aerial mycelium is abundant and velvety to powdery. The color is purplish grey. There is no soluble pigment.

(iv) On glucose-asparagine-agar Vishinsky medium, incubated at 28° C. for 20 days: The growth is good and cream colored or colorless at first and gradually change to purplish tinge later. The formation of aerial mycelium is abundant and velvety to powdery. The color is purplish grey. There is no soluble pigment.

(v) On calcium malate-agar medium, incubated at 28° C. for 20 days: The growth is thin and purple colored. There is neither aerial mycelium nor soluble pigment.

(vi) On glycerol-calcium malate-agar medium, incubated at 28° C. for 20 days: The growth is good and dark purple colored. Aerial mycelium is white to faint purplish grey colored. There is no soluble pigment.

(vii) On meat extract-agar medium, incubated at 28° C. for 20 days: The growth is cream colored. There is neither aerial mycelium nor soluble pigment.

(viii) On glucose-meat extract-agar medium, incubated at 28° C. for 20 days: The growth is good and cream colored, and the area where the aerial mycelium has been formed becomes pink colored gradually. Aerial mycelium is partly formed in the later stage of cultivation and greyish white to faint grey colored. There is no soluble pigment.

(ix) On starch-ammonium sulfate-agar medium, incubated at 28° C. for 20 days: The growth is good and purplish colored. The formation of aerial mycelium is good and the color changes from white through red to purplish grey. There is soluble pigment of light purplish color. The starch-liquefaction is moderate.

(x) On potato plug, incubated at 28° C. for 20 days: The growth is highly wrinkled and cream colored. There is neither aerial mycelium nor soluble pigment.

(xi) On carrot plug, incubated at 28° C. for 20 days: The growth is highly wrinkled and cream or buff colored. There is neither aerial mycelium nor soluble pigment.

(xii) On egg medium, incubated at 28° C. for 20 days: The growth is good, smooth and dark red colored. There is neither aerial mycelium nor soluble pigment. The growth is slightly poor when incubated at 37° C.

(xiii) On Loeffler's coagulated serum medium, incubated at 28° C. and 37° C. for 20 days: The growth is weak and colorless. There is neither aerial mycelium nor soluble pigment. The medium is not dissolved.

(xiv) On skimmed milk medium, incubated at 28° C. for 20 days: The growth is good and occurs in the form of ring on the medium surface and on the inner wall of the tube. The color slowly changes from cream to red. Aerial mycelium is not found but there is soluble pigment of light brown color. The medium is coagulated but not peptonised. The growth is poor when incubated at 37° C.

(xv) On meat extract-gelatine medium, incubated at 20° C. for 40 days: The growth is good and cream colored. There is neither aerial mycelium nor soluble pigment. The dissolution of gelatine is little.

(xvi) On tyrosine-agar medium: The growth is good and dark red colored. Aerial mycelium is light grey colored and soluble pigment is dull red colored.

The nitrate-reducing capability, the tyrosinase reaction and the hydrogen sulfide reaction all have been found negative.

(3) Utilization of carbon sources:

(i) Glucose, starch, glycerol, dextrin, galactose, maltose and sodium citrate may be utilised.

(ii) Utilization of saccharose, sorbitol, sodium succinate and fractose is doubtful.

(iii) Arabinose, rhamnose, xylose, lactose, raffinose, inulin, dulcitol, mannitol, inositol, sodium acetate, salicin and cellulose may not be utilized.

As mentioned above, *Streptomyces varius* used according to the present invention is characterized by the growth of purple color and by the aerial mycelium of purplish grey color as well as by the remarkable formation of the aerial mycelia developed in the state of tuft. When any known species similar to *Streptomyces varius* are detected with reference to Waksman's "The actinomycetes" (1961) and other literatures, there may be found *Streptomyces purpurascens*, *Streptomyces coelicolor*, *Streptomyces griseus* var. *rhodochrous* and *Streptomyces californicus* etc., as the similar strain.

Among them, *Streptomyces purpurascens* is distinguishable from *Streptomyces varius* in that the former develops the aerial mycelium in the shape of spiral and whorl and gives thorny spores while the latter develops the linear, aerial mycelium and gives smooth spores.

*Streptomyces coelicolor* is similar to *Streptomyces varius* in that their aerial mycelium does not occur in the state of spiral and whorl but the mycelia develop in the state of tuft. However, the short length and waving tendency of the aerial mycelium of the former cannot be found in the latter.

Furthermore, strains belonging to the *Streptomyces coelicolor* generally produce soluble pigment of greenish blue color on potato plug and on calcium malate containing media, are positive to the nitrate-reducing reaction and dissolve gelatine highly. These properties, however, cannot be found in the ericamycin-producing organism used in the present invention. Moreover, *Streptomyces coelicolor* shows high ultilization of L-xylose, L-arabinose, D-mannitol and salicin etc., as the carbon source, as be contrary to *Streptomyces varius* used in the present invention. These differences in properties as pointed above are enough to distinguish the former from the latter.

Both of *Streptomyces griseus* var. *rhodochrous* and *Streptomyces californicus* may be deemd as variants of *Streptomyces griseus* if their morphological characteristics are interpreted principally and in a wide sense. With respect to the shape of the aerial mycellium, they are very much similar to Streptomyces varius but definitely distinguishable from the latter in that the aerial mycelium of the former does not exhibit the purplish grey color which characterises the aerial mycelium of the later. Furthermore, all the strains belonging to the species *Streptomyces griseus* are characterized by their high capability of dissolving the coagulated serum and starch and their capability of reducing a nitrate. However, these capabilities are not found in *Streptomyces varius*. In addition, *Streptomyces varius* may be distinct from the strains of *Streptomyces griseus* in that the former is characterized by possessing so-called "Nocardia" type-nature that the mycelium is divided into spherical or short-rod shaped cells when the cultivation is effected under specific conditions. On an agar medium, *Streptomyces varius* may form the aerial mycelium and spore chains which are typical of the genus Streptomyces, although this strain is unique in that its vegetative mycelium exhibits the "Nocardia" type-division. Moreover, *Streptomyces varius* is characterized by the capability of producing the new antibiotic substance ericamycin. In these circumstances, we have considered the ericamycin-producing organism used in the process of this invention a new species of the genus Streptomyces and have named it *Streptomyces varius* nov. S.P.

As be well known, the strains of the actinomycetes are likely to be subjected to natural and artificial variation and mutation and their properties are also likely to change in various ways. Thus, the above-described properties of the strain *Streptomyces varius* which is employed to produce ericamycin in the process of the invention are changeable, so that the above-described properties of the ericamycin-producing organism are not decisive to differentiate said strain from other strains. Accordingly, *Streptomyces varius* includes the typical strain described above, as well as all natural and artificial variants and mutants thereof. That is, it can be defined that *Streptomyces varius* used in the present invention includes all of the ericamycin-producing strains except those which can absolutely be differentiated therefrom. As far as the purpose of the present invention to produce the new antibiotic substance ericamycin is concerned, the use of the above described typical strain of *Streptomyces varius* its related strains, its natural variants and mutants as well as artificial vriant and mutants thereof which my be obtained by any measure of X-ray radiation, ultra-violet ray radiation, chemical treatment and the like, should fall within the scope of the present invention.

To the cultivation of *Streptomyces varius* in the process of the present invention, there may be applied the generally known art and knowledge for the cultivation of the actinomycetes. Various, nutrient sources may be used in the culture medium. The nitrogen sources available include, for example, soy bean meal, peanut meal, corn steep liquor, peptone, meat extract, soluble vegetable protein, inorganic nitrates and ammonium sulfate etc. The carbon source available include, for example, starch, glucose, molasses and others. Appropriate inorganic salts and adjuvants may be added into the culture medium, if necessary.

For the production of ericamycin in large scale, it is preferred to cultivate *Streptomyces varius* in a liquid culture medium containing the above-mentioned nutrient sources. Particularly, it is advantageous to employ a method of deep aerated submerged cultivation. The cultivation temperature usually may be from 25 to 35° C. and preferably at a temperature in the vicinity of 27 to 28° C. It is preferable to adjust the pH of the culture medium so that the final value of pH in the fermentation medium will be 4–9 and particularly 7–8.

When the deep aerated submerged cultivation has been carried out for a period of 3 to 4 days, a substantial amount of ericamycin to be produced is usually accumulated in the culture.

The accumulated ericamycin may be recovered and isolated from the culture by physical and chemical methods which are conventional to the processes of extracting any known soluble antibiotics and which utilize the above-mentioned characteristic properties of ericamycin. For instance, ericamycin may be extracted from the culture itself, the culture filtrate or the filtration residue containing the mycelium cake by acidifying it with hydrochloric acid and treating it with a water-immiscible organic solvent such as ethyl acetate, butyl acetate, methyl isobutyl ketone and the like. The resulting solution of ericamycin in the organic solvent used is then concentrated under a reduced pressure at a temperature of 40° C. or below to give a concentrate of reddish brown color. When an amount of petroleum ether or hexane is added to the concentrate, there is deposited a precipitate of the reddish brown color which is then separated by filtration or decantation. This precipitate obtained mainly consists of the effective substance. This crude product of ericamycin may easily be purified by any conventional purification method such as column chromatography in alumina or silica gel, counter-current distribution and fractional crystallization etc. Purified ericamycin is obtained in the form of reddish-orange colored crystals.

Alternatively, the solution of ericamycin in the organic solvent may be added with an amount of a base such as sodium hydroxide. In this case, ericamycin may be deposited as a precipitate of a bluish purple color. When this precipitate is separated therefrom, then re-dissolved in an organic solvent containing a quantity of acid such as hydrochloric acid and then recrystallized from the solution, there may be obtained crystals of pure ericamycin.

The invention is now ilustrated with reference to the following examples in which the assay of ericamycin was made according to duplicate dilution method by using *Streptomyces aureus* as the testing organism in a bouillon broth and in which crystalline ericamycin was deemed as having a potency of 1000 units per mg.

EXAMPLE 1

*Streptomyces varius* was inoculated to a liquid medium having a pH of 7.0 and containing 2.0% of starch, 1.0% of peptone, 0.3% of meat extract and 0.05% of potassium secondary phosphate and then cultured under aeration at 28° C. for 24 hours to yield a seed culture. A cultivation tank with a capacity of 400 l. was then charged with 250 l. of a liquid medium consisting of 2.5% of starch, 0.6% of glucose, 3.0% of soybean meal, 0.5% of soluble vegetable protein, 0.001% of calcium carbonate and 0.2% of soybean oil and having a pH of 7.2. To this liquid medium was inoculated said seed culture in a concentration of 5%. The cultivation was then carried out at 28° for 109 hours under agitation and aeration. 300 l. of the resulting culture which had a pH of 8.3 and contained 0.1 u./ml. of ericamycin was then filtered using Hyflo Super Cel (trade name) as the filtration aid. 220 l. of the resultant filtrate was adjusted to a pH of 2.2 by addition of hydrochloric acid and then extracted with 70 l. of ethyl acetate. The extract was washed with water in a volume of about a half as much as that of the extract, then concentrated to a volume of about one-hundredth of the original volume and subsequently added with 2 l. of petroleum ether to give a precipitate of a reddish brown color. This precipitate was washed with 300 ml. of the upper phase of a 2:2:1:2 mixture of methanol, ethyl acetate, chloroform and water to yield 5.5 grams of a crude product of ericamycin which had a potency of 8.3 u./mg. This crude product was then subjected to a column chromatography. 50 g. of silica gel powder (produced by Merk Co. in Germany) was placed on the bottom of a column of 2.8 cm. in its inner diameter. On this mass of silica gel powder, there was piled up 10 g. of silica which had adsorbed the crude product of ericamycin. The charge was washed with 300 ml. of benzene and then eluted with a 100:1 mixture of benzene and methanol. There were recovered 100 ml. of the first fraction of a purple color and 200 ml. of the second fraction of a red color. This fraction of red color was concentrated to about 20 ml., cooled and kept at a low temperature to deposit crystals. These crystals were filtered out to yield 18 mg. of ericamycin in the form of reddish-orange colored crystals which showed a potency of 1000 u./mg. Yield was 60% as calculated on the second culture.

EXAMPLE 2

A seed culture was prepared in a similar way to Example 1. A cultivation tank of a capacity of 600 l. was charged with 300 l. of a liquid medium consisting of 2.0% of starch, 1.0% of waste molasses, 3.5% of soybean meal, 0.5% of soluble vegetable protein, 0.2% of sodium chloride, 0.001% of zinc sulfate, 0.001% of manganese sulfate and 0.2% of soybean oil. To this liquid medium was inoculated the seed culture in a concentration of 5%. The cultivation was carried out at 28° C. for 76 hours under agitation and aeration.

260 l. of the resulting culture which had a pH of 7.49 and contained 10.3 u./ml. of ericamycin was adjusted to a pH of 2.2 by addition of hydrochloric acid and then stirred together with 130 l. of ethyl acetate for 3 hours. The mixture was separated in a Sharpless centrifuger to give 88 l. of the extract. This extract was washed with 44 l. of water, concentrated to about 250 ml. and then added with 500 ml. of petroleum ether to deposit 46 g. of a precipitate of a red color which contained 33 u./mg. of ericamycin. This precipitate was washed with 250 ml. of methanol and filtered out to yield a crude product of ericamycin. The crude product was washed with 100 ml. of methanol and then with 100 ml. of benzene and thereafter dissolved in one liter of ethyl acetate. The solution was added with 3 l. of benzene and concentrated to 500 ml., and the concentrate was cooled and kept at a low temperature to deposit crystals. Filtration gave 1.15 g. of a crystalline, crude product of ericamycin. Recrystallization of this crude product from ethyl acetate yielded 500 mg. of crystalline ericamycin which had a potency of 1000 u./mg. Yield was about 20% as calculated on the second culture.

EXAMPLE 3

A cultivation tank of a capacity of 20 l. and made of glass was charged with 12 l. of a liquid medium having the same composition as that of the liquid medium which was employed in Example 1. To this liquid medium was inoculated a seed culture of *Streptomyces varius*. The cultivation was carried out at 28° C. for 108 hours under agitation and aeration. 11 liters of the resulting culture which had a pH of 7.8 and contained 6.4 u./ml. of ericamycin were adjusted to a pH of 2.2 by addition of hydrochloric acid and then stirred together with the same volume of ethyl acetate for 30 minutes. The mixture was separated to give 10 l. of the extract which was then washed with 5 l. of water, concentrated to about 100 ml. and subsequently added with 500 ml. of petroleum ether. There was obtained 2.7 g. of a reddish-brown colored precipitate which contained 40 units/mg. of ericamycin.

What we claim is:

1. An antibiotic substance, ericamycin, having an activity inhibitory to the growth of Gram-positive bacteria, ericamycin being a substance which is soluble in dimethyl sulfoxide, dimethyl formamide, tetrahydrofuran and dioxane; slightly soluble in methyl ethyl ketone, methyl isobutyl ketone, ethyl acetate, butyl acetate, methanol, ethanol, acetone, ethyl ether, chloroform and benzene; and little soluble in water, petroleum ether, hexane and carbon tetrachloride, which forms a reddish orange-colored needle-like or platelet-like crystal of a melting point of 260° C.–265° C. with decomposition; its acidic solution in an organic solvent showing a red color; its alkaline solution in an organic solvent showing a bluish purple color; its solution in concentrated nitric acid showing a yellow color; its solution in concentrated sulfuric acid showing a bluish purple color; its alcoholic solution giving a purple color when reacted with iron perchloride; its alcoholic solution giving a purple colored precipitate when lead acetate is added thereto; and the alcoholic solution losing its color when acetic acid and zinc are added thereto but recovering its color when the solution is allowed to stand, which gives a negative reaction to ninhydrin reagent, which contains only the elements carbon, hydrogen, nitrogen and oxygen and has the empirical formula $C_{31}H_{23}O_8N$; the molecular weight of ericamycin being 450–525 as determined by Barger method, which exhibits the characteristic absorption bands in the infrared region of the spectrum when pelleted with potassium bromide at the following frequencies in cm.$^{-1}$: 3370, 3180, 1639, 1619, 1480, 1420, 1370, 1268, 1250, 1140, 1110, 1055, 1038, 968, 875, 805, 730 and 675, and which exhibits in the visible and ultraviolet region of the spectrum five maximum absorption bands at the wave lengths of 250, 324, 346, 364 and 490 milli-microns when dissolved in methanol, five maximum absorption bands at the wave lengths of 250, 324, 346, 364 and 490 milli-microns when dissolved in methanol containing 0.01 N hydrochloric acid; and three maximum absorption bands at the wave lengths of 254, 360 and 525 milli-microns when dissolved in methanol containing 0.01 N sodium hydroxide.

2. A process for the production of the antibiotic substance ericamycin as defined and claimed in claim 1, which comprises cultivating *Streptomyces varius* ATCC No. 19562 in a culture medium comprising assimilable sources of carbon and nitrogen until substantial antibiotic activity is produced by said organism in said culture medium, and then recovering the antibiotic substance from said medium.

3. A process as claimed in claim 2 wherein the cultivation is carried out by the deep aerated submerged method.

4. A process as claimed in claim 2 wherein the cultivation temperature is at a temperature of from 25 to 35° C., and particularly from 27 to 28° C.

5. A process as claimed in claim 2 wherein the cultivation is carried out in a culture medium having a pH value so adjusted that the final value of the culture will be a pH of from 4 to 9, and particularly from 7 to 8.

6. A process as claimed in claim 2 wherein ericamycin is recovered from the culture by extracting the culture with a solvent selected from the group consisting of ethyl acetate, butyl acetate and methyl isobutyl ketone, concentrating the extract and precipitating a crude ericamycin by addition of a compound selected from the group consisting of petroleum ether and hexane.

7. A process as claimed in claim 2 wherein ericamycin is recovered from the culture by extracting the culture with a solvent selected from the group consisting of methanol, ethanol and ethyl acetate and adding sodium hydroxide to the extract to precipitate a crude ericamycin.

References Cited

Shimura et al., J. of Antibiotics, Sera, XIX, No. 2, pp. 51–55 (March 1966).

JEROME D. GOLDBERG, Primary Examiner

U.S. Cl. X.R.

195—80